United States Patent [19]

Wiener

[11] 4,065,084

[45] Dec. 27, 1977

[54] FOLDABLE STAND

[75] Inventor: Hans Wiener, Taby, Sweden

[73] Assignee: Pressmaster Ltd., Stockholm, Sweden

[21] Appl. No.: 672,335

[22] Filed: Mar. 31, 1976

[30] Foreign Application Priority Data

Apr. 15, 1975 Sweden .................. 7504281

[51] Int. Cl.² ........................... D06F 75/40
[52] U.S. Cl. .................. 248/117.1; 248/302; 248/314
[58] Field of Search ........... 248/117.1, 117.2, 117.3, 248/117.4, 117.6, 117.7, 150, 166, 302

[56] References Cited

U.S. PATENT DOCUMENTS

| 880,871 | 3/1908 | Fell | 248/117.2 |
| 1,523,555 | 1/1925 | Murphy | 248/117.6 |
| 3,215,379 | 11/1965 | Rico | 248/117.2 |
| 3,294,348 | 12/1966 | Cerisano | 248/117.4 |
| 3,550,888 | 12/1970 | Lehrman | 248/117.2 |

FOREIGN PATENT DOCUMENTS 980,118  12/1950  France .................. 248/302

Primary Examiner—William H. Schultz
Attorney, Agent, or Firm—Karl F. Ross

[57] ABSTRACT

A foldable stand for a soldering iron comprises a holder having a rear end articulated to a base in the form of a wire bracket with two lateral arms which converge in a forward direction away from its junction with the holder, the arms passing through two pairs of openings in a slider linked with a front end of the holder whereby a rearward shift of the slider folds the holder against the bracket. The openings are so spaced that this rearward shift causes an overlapping of the free ends of the arms which have nooks registering with each other in that overlapping position to form a cradle about which the electric cord of the iron can be wound.

10 Claims, 4 Drawing Figures

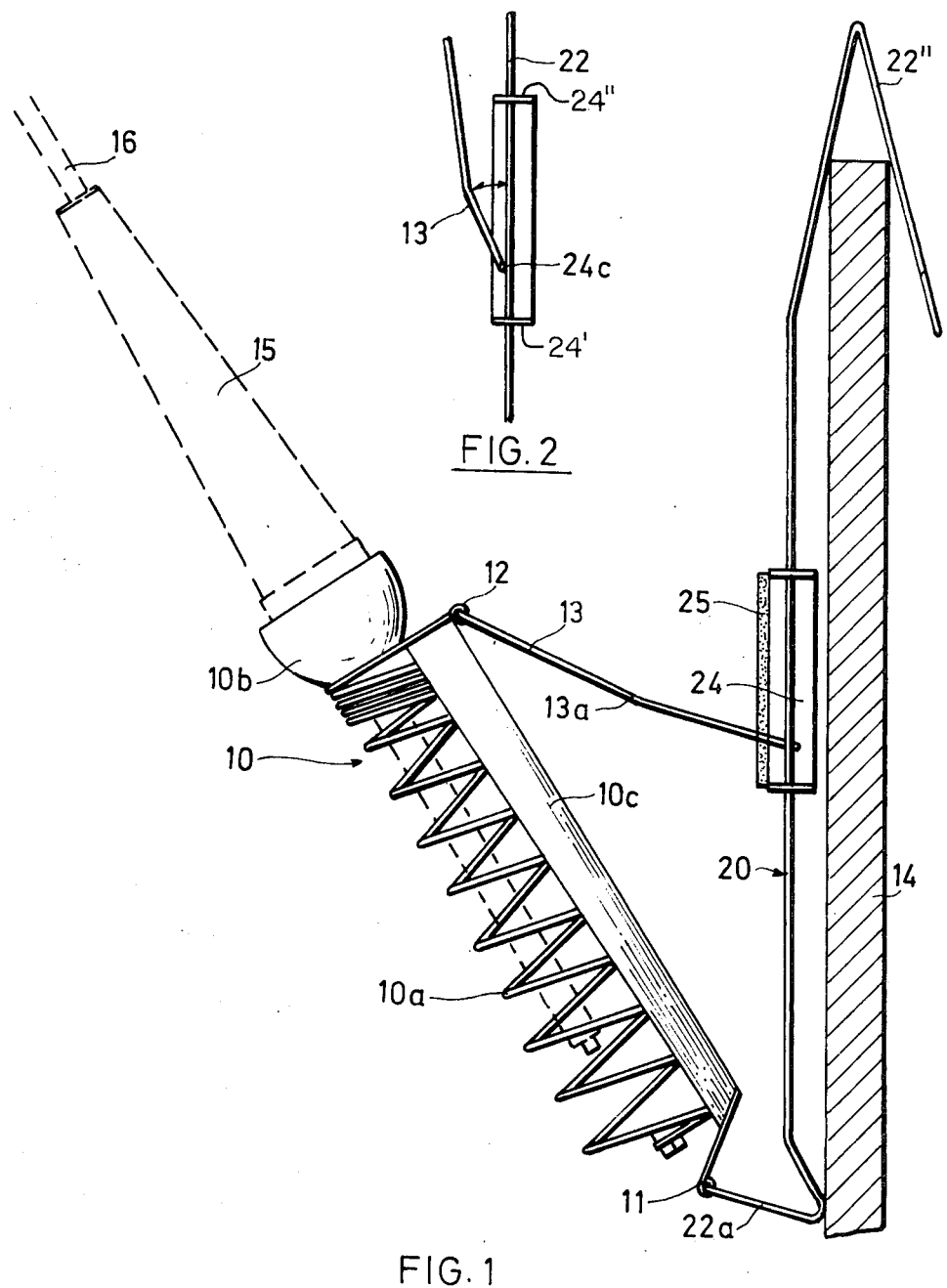

4,065,084

FOLDABLE STAND

This invention relates to a foldable stand for a soldering iron, especially an electrical one. Stands of this kind, as is known, serve the purpose of making it possible to set down a hot soldering iron without exposing people or pieces of equipment to dangerous heat. There have already become known stands of this kind wherein the actual holder for the soldering iron is swivelably connected to a base component, so that the stand can be folded, for example for transport purposes, thus taking up less space.

The the object of my invention is to provide an improved foldable stand of this kind.

A foldable stand according to my invention comprises a holder articulated at its rear end to a supporting bracket therefor, its front end forming a seat for the handle of a soldering iron. The bracket has a pair of forwardly converging flexible arms shiftably engaged by a slider which is pivotally connected, via a suitable link, with the front end of the holder for drawing the seat of the soldering-iron handle toward the bracket upon a rearward shifting of the slider from an advanced position, in which that seat is separated from the bracket by a distance approximating the length of the link, into a rearwardly retracted position. The arms of the bracket have three ends which are spread apart in the advanced position but are closely juxtaposed in the rearwardly retracted position of the slider. Thus, the bracket forms a broad base for the holder in an unfolded position of the stand in which it supports that holder at three points; in the folded position, however, the width of the base is significantly reduced.

According to a more particular feature of my invention, the bracket — preferably consisting of iron or steel wire — has the free ends of its arms bent laterally outwardly into a pair of generally transverse wings overlapping each other in the rearwardly retracted slider position. For accommodating a soldering iron provided with an electric cord attached to its handle, the wings may have forwardly facing nooks registering with each other in that retracted slider position to form a cradle for that cord.

The above and other features of my invention will now be described in detail with reference to the accompanying drawing in which:

FIG. 1 is a schematic side view of a foldable stand according to the invention;

FIG. 2 is a side view of a slider of the stand in its folded or closed-up position;

Figures 3, 4:
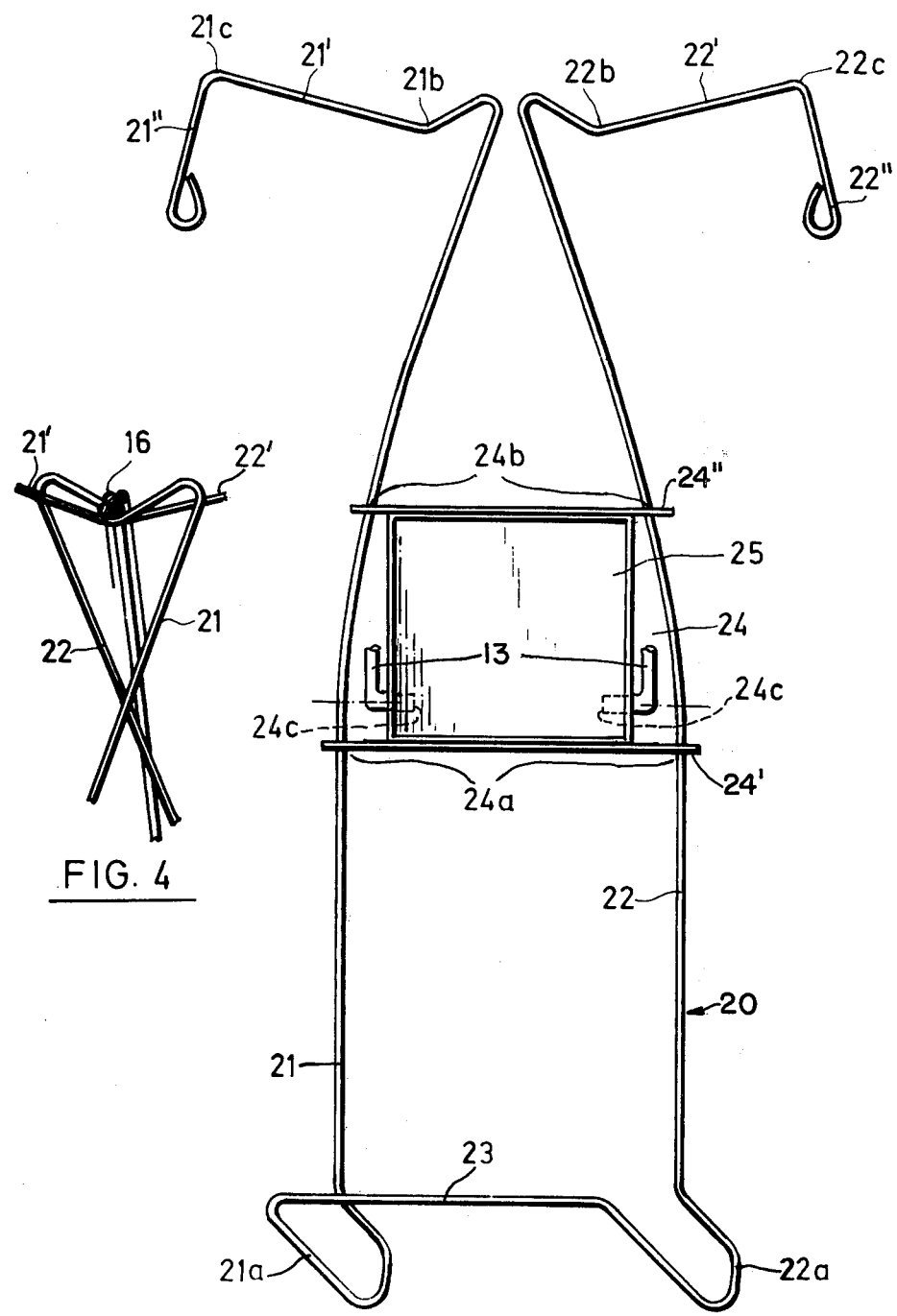
FIG. 3 is a plan view of a supporting bracket of the stand.
FIG. 4 is a plan view of the front part of the support bracket of FIG. 3 in the folded position of the stand.

As shown in the drawing, the foldable stand according to the invention includes a holder 10 and a supporting bracket or base 20. The holder 10 is shown to comprise an expanding coil 10a, which offers protection against contact but does not hinder the cooling down of a soldering iron 15 with a feeder cable 16 pushed into the holder and shown in broken lines. The handle of soldering iron 15 is inserted into a receiving socket 10b. There is disposed alongside the coil 10a trough 10c designed to catch pieces of tin or the like possibly dropping off the iron.

The holder 10 is provided at its rearward end with at least one eye 11 articulatedly connected with a middle part or bight portion 23 of the yoke-shaped bracket 20. In an analogous manner at least one eye 12 is arranged at the forward part of the holder 10 is articulated to a link 13 having preferably the form of an inverted "U".

The bracket 20, consisting for example of steel wire, has essentially the U-shape seen in FIG. 3 with arms 21, 22 converging forwardly. At the transition between the middle part 23 and the arms 21, 22 the wire is bent into parallel downward loops 21a, 22a which act as feet in the unfolded condition of the stand (FIG. 1).

At their forward ends the arms 21, 22 are bent laterally outwardly in such a way that forwardly facing nooks 21b, 22b are formed with two generally transverse 22'. These wings 21', 22' are bent once more to the rear at 21c, 22c, to form grippers 21", 22" with looped extremities. Grippers 21", 22", on setting up of the unfolded stand, may be left resting on a support surface or else, in order to increase the stability of the stand, be pushed in behind a vertical or horizontal plate 14 — such as a table top — as shown in FIG. 1.

The grippers 21", 22" may alternatively serve for clipping or hooking the stand onto the waistband of a pair of working trousers or onto a belt or other article worn or supported about the waist of a workman, in which event the stand forms a portable sheath for the soldering iron.

A slider 24 on the supporting bracket 20 has a rear wall 24' with a pair of throughgoing openings or slots 24a and a front wall 24" with another pair of such openings 24b traversed by arms 21 and 22. The forward openings 24b may be closer to each other than the rear openings 24a as shown. Openings 24c for a pivotal mounting of link 13 are, moreover, provided in the side walls of slider 24. A cleaning sponge 25 for the tip of the soldering iron 15 disposed in the slider 24, is freely accessible in the unfolded position but in the folded position is at least partly covered and protected by the holder 10 or its trough 10c.

The link 13 is bent slightly at 13a so that its legs straddling the slider 24 form an obtuse angle confronting the slider, the lower ends of these legs including an acute angle with the arms 21, 22 of the supporting bracket 20 even in the folded position of the stand (FIG. 2). As a result, the folded stand does not lock closed, but can easily be opened, i.e. spread out, by displacing the slider 24 forwardly.

The closer spacing of the front openings 24b of slider 24 with reference to its rear openings 24a together with the flexibility of the supporting bracket 20, has the consequence that upon a rearward shifting of the slides to close the stand, the forward ends of the arms 21, 22 with the nooks 21b, 22b move even closer to one another until they reach a position in accordance with FIG. 4 in which they overlap one another. These nooks then form a cradle around which the cable 16 can be wound as is shown in FIG. 4.

It is obvious that the length of the arms 21, 22 or the forward parts thereof, which in the advanced position of slides 24 project beyond the seat-forming socket 10b of the holder 10, may advantageously be so chosen that the wound-on cable 16 keeps the soldering iron 15 in the holder. At the rear end of the folded stand the loops 21a, 22b may serve as guides for the wound-up cable.

In the advanced position of slider 24 illustrated in FIG. 1, the front end of holder 10 and therefore the seat 10b for the handle of iron 15 is separated from bracket 20 by a distance almost equal to the length of link 13. Furthermore, as likewise seen in FIG. 1, the length of this link is substantially less than the distance between eyes 11 and 12 whereby trough 10c will closely approach the bracket 20 when the slider 24 is moved into its retracted position near the loops 21a, 22a.

I claim

1. A foldable stand for a soldering iron having a handle, comprising a holder and a supporting bracket therefor, said holder having a rear end articulated to said bracket and a front end forming a seat for said handle, said bracket having a pair of forwardly converging flexible arms; a slider shiftably engaging said arms; and a link pivotally connecting said front end with said slider for drawing said seat toward said bracket upon a rearward shifting of said slider from an advanced position in which said seat is separated from said bracket by a distance approximating the length of said link, said arms having free ends spread apart in said advanced position of the slider but closely juxtaposed in a rearwardly retracted position thereof.

2. A stand as defined in claim 1 wherein said bracket consists of wire.

3. A stand as defined in claim 2 wherein said bracket is yoke-shaped and has a bight portion integrally joined to said arms by a pair of parallel wire loops.

4. A stand as defined in claim 3 wherein said holder is provided at said rear end with an eye traversed by said bight portion.

5. A stand as defined in claim 2 wherein said slider has a front wall and a rear wall each provided with a pair of openings traversed by said arms, the openings of said front wall being more closely spaced from each other than the openings of said rear wall.

6. A stand as defined in claim 1 wherein said free ends are bent laterally outwardly into a pair of generally transverse wings overlapping each other in said rearwardly retracted position of said slider.

7. A stand as defined in claim 6 wherein said wings have forwardly facing nooks registering with each other in said rearwardly retracted position to form a cradle for an electric cord attached to said handle.

8. A stand as defined in claim 6 wherein said wings have rearwardly bent hook-forming extremities.

9. A stand as defined in claim 1 wherein said link has a pair of legs straddling said slider, said legs being bent at an obtuse engle facing said slider.

10. A stand as defined in claim 1 wherein said holder includes a coil adjoining said seat and a trough alongside said coil on the side of said bracket, further comprising a sponge on said slider overlain by said trough in said rearwardly retracted position of said slider.

* * * * *